(12) United States Patent
Umeda et al.

(10) Patent No.: US 7,079,267 B2
(45) Date of Patent: Jul. 18, 2006

(54) IMAGE PROCESSING APPARATUS, METHOD, COMPUTER PROGRAM AND RECORDING MEDIUM

(75) Inventors: Kiyoshi Umeda, Kanagawa (JP); Nobutaka Miyake, Kanagawa (JP); Minoru Kusakabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 801 days.

(21) Appl. No.: 10/244,016

(22) Filed: Sep. 16, 2002

(65) Prior Publication Data

US 2003/0059083 A1    Mar. 27, 2003

(30) Foreign Application Priority Data

Sep. 25, 2001 (JP) .............................. 2001-291860

(51) Int. Cl.
G06K 9/00 (2006.01)
G06F 15/00 (2006.01)

(52) U.S. Cl. ..................... 358/1.14; 382/100; 358/3.28

(58) Field of Classification Search ............... 358/3.28; 380/219, 201; 382/100, 232; 283/70; 345/430; 383/70

See application file for complete search history.

(56) References Cited

U.S. PATENT DOCUMENTS

| | | | |
|---|---|---|---|
| 5,257,119 A | 10/1993 | Funada et al. | |
| 5,652,626 A | 7/1997 | Kawakami et al. | |
| 6,354,630 B1 * | 3/2002 | Zhang et al. | 283/70 |
| 6,738,493 B1 * | 5/2004 | Cox et al. | 382/100 |
| 6,870,931 B1 * | 3/2005 | Jones et al. | 380/219 |

FOREIGN PATENT DOCUMENTS

| | | |
|---|---|---|
| EP | 1 102 474 A2 | 5/2001 |
| JP | 7-123244 | 5/1995 |
| JP | 2614369 | 2/1997 |
| JP | 2000-188677 | 7/2000 |
| JP | 2001-024877 | 1/2001 |
| JP | 2001-148778 | 5/2001 |

* cited by examiner

*Primary Examiner*—Kimberly Williams
*Assistant Examiner*—Scott Schlack
(74) *Attorney, Agent, or Firm*—Fitzpatrick, Cella, Harper & Scinto

(57) ABSTRACT

Provided are an image processing apparatus, method, computer program and recording medium capable of embedding a large quantity of additional information in image information upon dispersing the information in such a manner that it will not be noticeable visually. An error correction code is calculated from additional information [x(i)] to be added to image information (D1), and multiplexed information [y(j)] in which the error correction code has been added to the additional information is generated by an error correction encoder (13). Next, the bit sequence of the multiplexed information [y(j)] that has been generated is rearranged into a prescribed bit sequence by a shuffling unit (14), whereby multiplexed information [z(j)] is generated. Furthermore, the multiplexed information [z(j)] whose bit sequence has been rearranged is embedded in the image information (D1) by an additional-information multiplexer (15), whereby image information (D2) is generated. The image information (D2) in which the multiplexed information [z(j)] has been embedded is printed by a printer (16) and is output as a printed image (17).

11 Claims, 13 Drawing Sheets

A : AREA IN WHICH ERRORS TEND TO OCCUR

▨ : BLOCK IN WHICH ERROR HAS OCCURRED

◨ : BLOCK AFTER SHUFFLING

IMAGE PROCESSING APPARATUS, METHOD, COMPUTER PROGRAM AND RECORDING MEDIUM

FIELD OF THE INVENTION

This invention relates to an image processing apparatus, method, computer program and recording medium for embedding additional information, such as voice information, textual document information, image-related information and non-image related information, in image information, and printing this additional information in such a manner that it will not be noticeable visually.

BACKGROUND OF THE INVENTION

In order to prevent the unlawful copying and falsifying of image information, extensive research has been conducted with a view to embedding specific information in this image information. Means for achieving this is referred to as an electronic watermark. For example, a known technique is to embed additional information in image information obtained by electronically digitizing photographs and pictures, wherein the additional information is the name of the copyright holder or an indication as to whether use of the image is allowed or not. A technique that has been standardized in recent years involves embedding additional information in original image information in such a manner that the additional information is not noticeable visually, and distributing this image information over a network such as the Internet.

Another technique being studied involves arranging it so that additional information can be identified from the paper on which an image has been printed, wherein the additional information is the type of the printer that printed the image, the model number of the printer, etc. Improvements in the image quality of image forming devices such as copiers and printers have been accompanied by use of this technique for the purpose of preventing the counterfeiting of banknotes, stamps and securities, etc.

By way of example, the specification of Japanese Patent Application Laid-Open No. 7-123244 proposes a technique for embedding additional information in that part of an image of low visual sensitivity in which color-difference and saturation components are in the high-frequency region. Further, the specification of Japanese Patent No. 2614369 proposes a technique for embedding additional information in image information by adding on a specific dot pattern using a color that is comparatively difficult for the human eye to distinguish, such as the color yellow.

Though the conventional methods described above are effective in terms of embedding a comparatively small quantity of information for preventing counterfeiting, such as the identification number of the printer, the printing date and user information, in an image, it is very difficult for these methods to embed voice information and other information of large quantity in an image so as not be noticeable at the time of printing.

Accordingly, in the specification of Japanese Patent Application Laid-Open No. 2001-148778, the present applicant has proposed means for solving this problem, namely a method of utilizing texture, which is produced by the error diffusion method, to artificially create a combination of quantization values not generated in ordinary quasi-continuous tone processing, and embedding the created code in image information. In accordance with this method, the form of the texture changes microscopically and therefore image information after it has been embedded with the additional information exhibits no visual decline in image quality when compared with the original image. Further, the multiplexing of signals of different types can be achieved very easily by changing the quantization threshold value used in the error diffusion method.

Accordingly, an image processing system proposed previously by the present application will now be described. The system includes an image processing apparatus for embedding additional information in image information and printing the result, and an image processing apparatus for extracting the embedded additional information from the printed image. FIG. 12 is a block diagram illustrating the structure of the image processing apparatus that embeds additional information in image information and prints the result.

As shown in FIG. 12, multitone image information D4 enters from an input terminal 121. Additional information $x_2(i)$, which is to be embedded in the image information D4, enters from an input terminal 122. Various information is applied as the additional information $x_2(i)$, namely information having absolutely no relation to the image information D4 and information relating to copyright of the image information D4.

The additional information $x_2(i)$ that has entered from the input terminal 122 is applied to an error correction encoder 123 having a function for automatically correcting a bit error. The encoder 123 applies encoding processing to the information to obtain an error correction code. A block code such as BCH code or Reed-Solomon code or a code such as a convolution al code is used as the error correction code. Information obtained as a result of subjecting the additional information $x_2(i)$ to encoding processing for conversion to an error correction code shall be referred to as multiplexed information $y_2(j)$.

The image information D4 and the multiplexed information $y_2(j)$ enter an additional-information multiplexer 124. The latter divides the image information D4 into small square blocks in such a manner that the multiplexed information $y_2(j)$ to be embedded in the image information D4 will not be noticeable visually at the time of printing, and embeds the multiplexed information $y_2(j)$ on a per-block basis. The additional-information multiplexer 124 applies quantization to the image information obtained by embedding the multiplexed information $y_2(j)$ in the image information D4. Image information D5 obtained through quantization by the additional-information multiplexer 124 is printed on paper by a printer 125, whereby a printed image 126 is obtained. The printer 125 used is a printer such as an inkjet printer or laser printer for expressing tones by using quasi-continuous tone processing.

FIG. 13 is a block diagram illustrating the structure of a previously proposed image processing apparatus for reading and extracting additional information from a printed image. As shown in FIG. 13, the printed image 126 that has been printed by the image processing apparatus of FIG. 12 is read using an image scanner 131, whereby image information D6 is obtained. Next, embedded multiplexed information $y_2'(j)$ is separated from the image information D6 by the operation of an additional-information demultiplexer 132. The latter divides the image information D6 into square blocks and analyzes the frequency components of texture on a per-block basis, thereby separating the embedded multiplexed information $y_2'(j)$. An error correction decoder 133 subjects the separated multiplexed information $y_2'(j)$ to error correction decoding processing, whereby additional information $x_2(i)$ is acquired. The additional information $x_2(i)$ is output from an output terminal 134. Algorithms relating to multiplexing and decoding are described in the specification of Japanese Patent Application Laid-Open No. 2001-148778 and therefore are not discussed here. By applying the above-described method, it is possible to embed a large quantity of additional information in a certain image without degrading the quality of this image as compared with the conventional method.

In a case where additional information is embedded in a print image using the method disclosed in the specification of Japanese Patent Application Laid-Open No. 2001-148778, reading errors tend to occur in regions where density is extremely high, regions where density is extremely low, or regions that contain main frequency components that resemble the frequency of the texture used to express the additional information. The reason for this is that these regions are often concentrated in a specific area of the image. Hence there is a tendency for reading errors to concentrate in such a specific area. In the event of the occurrence of a burst error, which is such an error in a specific area, it is necessary to raise the error correction capability greatly if use is made of an encoding method, such as BCH encoding, in which encoding processing is executed in units of a fixed code length. As a consequence, there is a relative decrease in the quantity of information that can be embedded.

Means for dispersing reading errors is an effective solution to this problem. However, the conventional techniques do not provide means for shuffling, in which after a printed image is read using an optical reading device, reading errors that occur when the additional information is reconstructed block by block are dispersed.

SUMMARY OF THE INVENTION

The present invention has been proposed to solve the aforementioned problems of the prior art and has as its object to provide an image processing apparatus, method, computer program and recording medium through which a large quantity of information that can be added on as additional information is dispersed to embed the information in such a manner that the information will not be noticeable visually.

According to the present invention, the foregoing object is attained by providing an image processing apparatus comprising: error correction encoding means for calculating an error correction code from additional information added to image information, and generating multiplexed information in which the error correction code calculated has been added to the additional information; shuffling means for rearranging a bit sequence of the generated multiplexed information into a prescribed bit sequence; and multiplexing means for embedding the multiplexed information, in which the bit sequence has been rearranged, in the image information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

An image processing system proposed by the present invention has two types of image processing apparatus, namely an image processing apparatus for embedding additional information in image information and printing the result, and an image processing apparatus for entering a printed image by an image scanner and extracting additional information from the image.

First Embodiment

The details of an image processing system according to a first embodiment of the present invention will now be described. Described first will be the structures of the two types of image processing apparatus according to the first embodiment of the invention.

Figure 1:
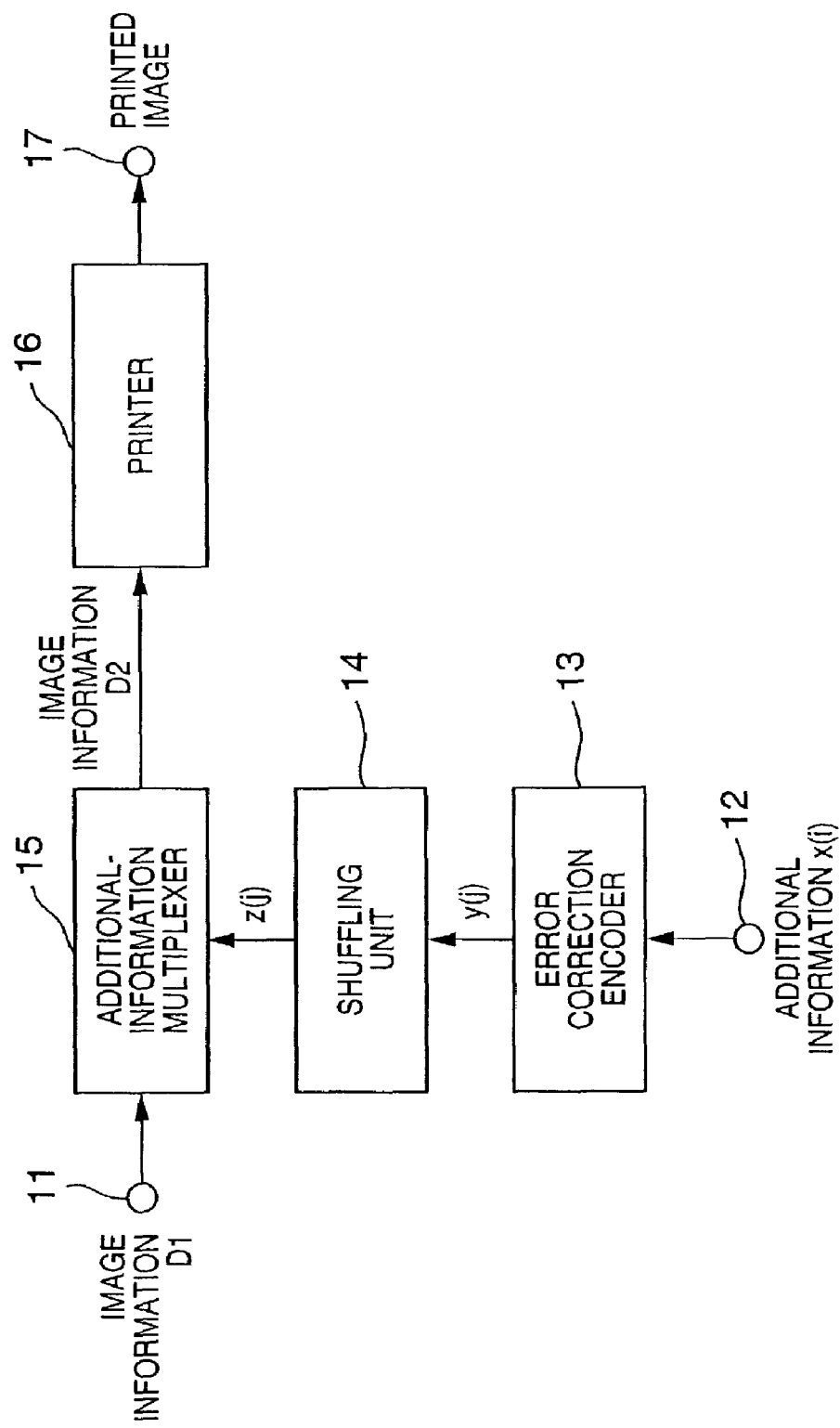
FIG. 1 is a block diagram useful in describing the structure of an image processing apparatus according to a first embodiment of the present invention for embedding additional information in image information and printing the result.

FIG. 1 is a block diagram useful in describing the structure of an image processing apparatus according to a first embodiment of the present invention for embedding additional information in image information and printing the result. An input terminal 11 is for entering multitone image information D1, and an input terminal 12 is for entering additional information x(i), having an arbitrary size of q bits, to be embedded in the multitone image information D1. Examples of the additional information x(i) is information relating to the image information D1 input from the input terminal 11, e.g., information relating the copyright of the image information D1; information not relating to image information D1, e.g., voice information and textual document information; and other image information.

The input terminal 12 is connected to an error correction encoder 13. The latter applies error correction processing to the entered additional information x(i), i.e., adds check bits onto the additional information x(i) and outputs the result as multiplexed information y(j), where j>q holds. Various codes have been proposed heretofore as the error correction code. Typical examples that can be mentioned are Reed-Solomon code, BCH code, Fire code and Peterson code. In the present invention, any of these codes may be used as the error correction code without any problem. In this embodiment, however, the BCH code, which has already been adopted in a variety of systems, is used owing to the simplicity of the code structure and the high encoding efficiency. The BCH-code algorithm need not be described here as the algorithm is well known.

In this embodiment, the BCH code is expressed by BCH(n,k,d), where the code length of the BCH code is n bits, of which k bits are information bits and the remaining n-k bits are check bits. This structure indicates that it is possible to correct an error of up to t bits, where it is assumed here that t represents the largest integer that will not exceed d/2.

The error correction encoder 13 is connected to a shuffling unit 14. The latter rearranges the bit sequence of the multiplexed information y(j) in accordance with a certain rule and outputs multiplexed information z(j) having a new bit sequence.

The shuffling unit 14 is connected to an additional-information multiplexer 15. The latter embeds the multiplexed information z(j), in which the bit sequence has been rearranged, in the entered image information D1. Furthermore, the additional-information multiplexer 15 generates image information D2, which is the result of embedding the multiplexed information in the image information D1 and performing quantization.

The additional-information multiplexer 15 is connected to a printer 16. The latter prints the image information D2, which has been generated by the additional-information multiplexer 15, as a printed image 17. Used as the printer 17 is one such as an inkjet printer or laser printer that expresses tones by using quasi-continuous tone processing. It is also possible for the printer 16 to be one which prints at a remote location via a network or the like.

More specifically, the first embodiment of the present invention is characterized by having error correction encoding means (the error correction encoder 13) for calculating an error correction code from additional information to be added to image information, and generating multiplexed information in which the error correction code calculated has been added to the additional information; shuffling means (the shuffling unit 14) for rearranging a bit sequence of the generated multiplexed information into a prescribed bit sequence; and multiplexing means (the additional-information multiplexer 15) for embedding the multiplexed information, in which the bit sequence has been rearranged, in the image information.

The first embodiment further includes printing means (the printer 16) for printing the image information in which the multiplexed information has been embedded.

Furthermore, the first embodiment is further characterized in that the multiplexing means divides the image information into tiles each having a predetermined size and embeds the bits of the bit sequence of the multiplexed information in each of the tiles in order. The first embodiment is further characterized in that the shuffling means generates a new bit sequence by rearranging, in order, bits extracted at prescribed intervals from the bit sequence of the multiplexed information.

Figure 2:
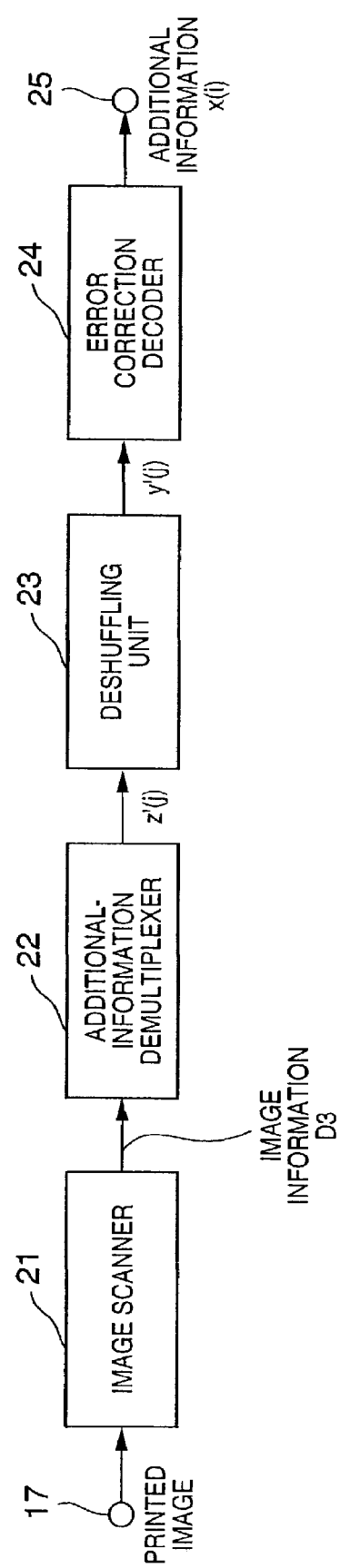
FIG. 2 is a block diagram useful in describing the structure of an image processing apparatus according to the first embodiment of the present invention for entering a printed image by an image scanner and extracting additional information from the image.

FIG. 2 is a block diagram useful in describing the structure of an image processing apparatus according to the first embodiment of the present invention for entering a printed image by an image scanner and extracting additional information from the image. In FIG. 2, an image scanner 21 optically reads a printed image 17, which has been printed by the image processing apparatus illustrated in FIG. 1, and converts the image to image information D3. The image scanner 21 is connected to an additional-information demultiplexer 22. The latter separates multiplexed information z'(j), in which the bit sequence of additional information has been rearranged by the method proposed by the specification of Japanese Patent Application Laid-Open No. 2001-148778, from the image information D3 relating to the printed image 17. The bit sequence of the multiplexed information z'(j) usually includes reading error ascribable to the optics of the image scanner used when reading is performed, the influence of the printer used in printing or the local properties of the image information in which the additional information is embedded.

The additional-information demultiplexer 22 is connected to a deshuffling unit 23. The latter executes processing that is the exact opposite of that executed by the shuffling unit 14 and outputs y'(j), which is obtained by rearranging the bit sequence z'(j).

The deshuffling unit 23 is connected to an error correction decoder 24. The latter applies error correction decoding processing to the multiplexed information y'(j) that has been separated, thereby obtaining the original additional information x(i). The additional information x(i) obtained is output externally from an output terminal 25.

Figure 3:
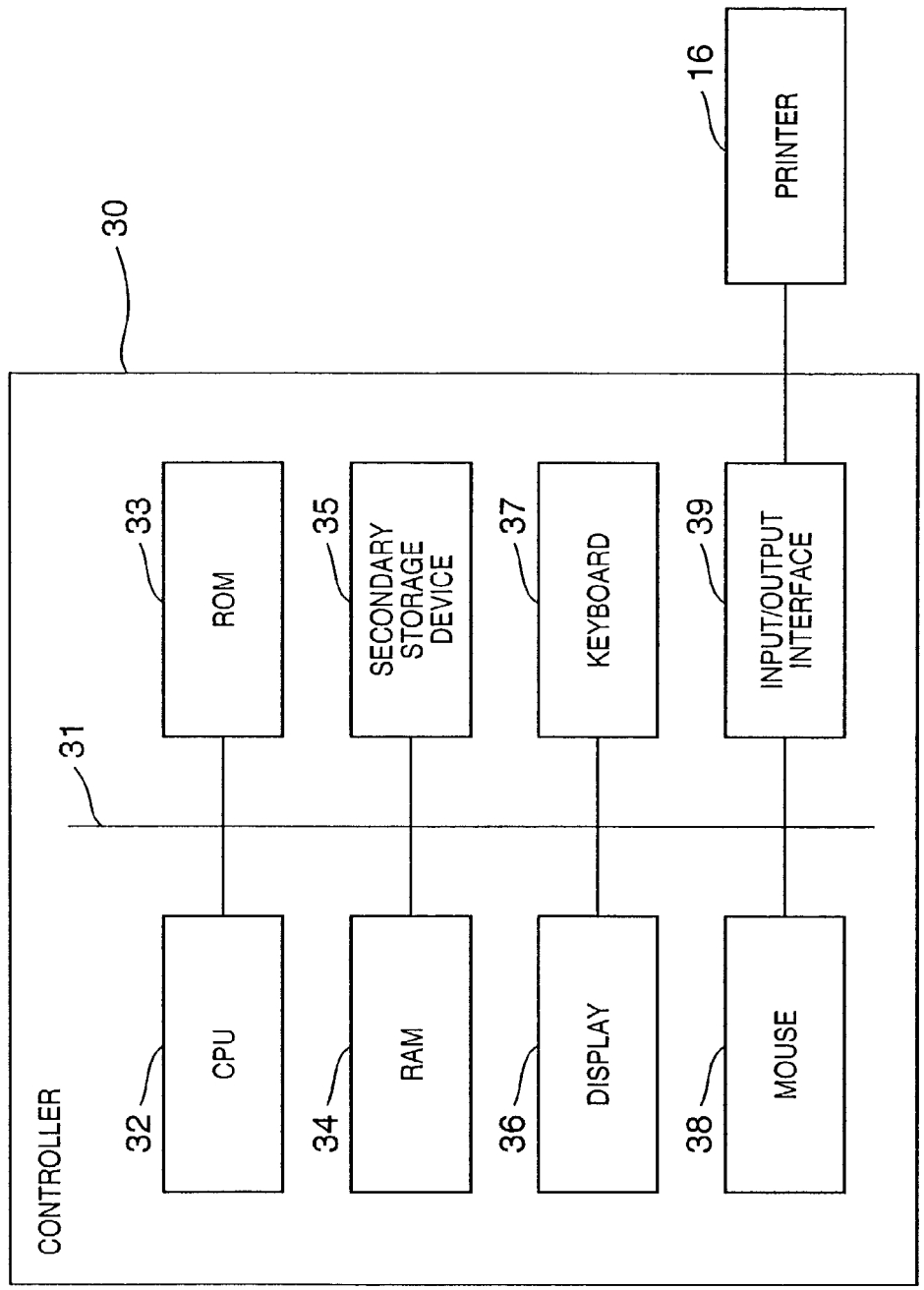
FIG. 3 is a block diagram for describing a controller that causes various processing units to operate in the present invention.

The processing described below is executed using a controller 30 shown in FIG. 3. FIG. 3 is a block diagram for describing the controller 30, which causes various processing units to operate in the present invention. As shown in FIG. 3, a CPU 32, a ROM 33, a RAM 34 and a secondary storage device 35 such as a hard disk are connected to a system bus 31. Further, a display 36, keyboard 37 and mouse 38 are connected to the CPU 32 as a user interface. The printer 16 for image output is connected to the controller 30 via an input/output interface 39.

Figure 4:
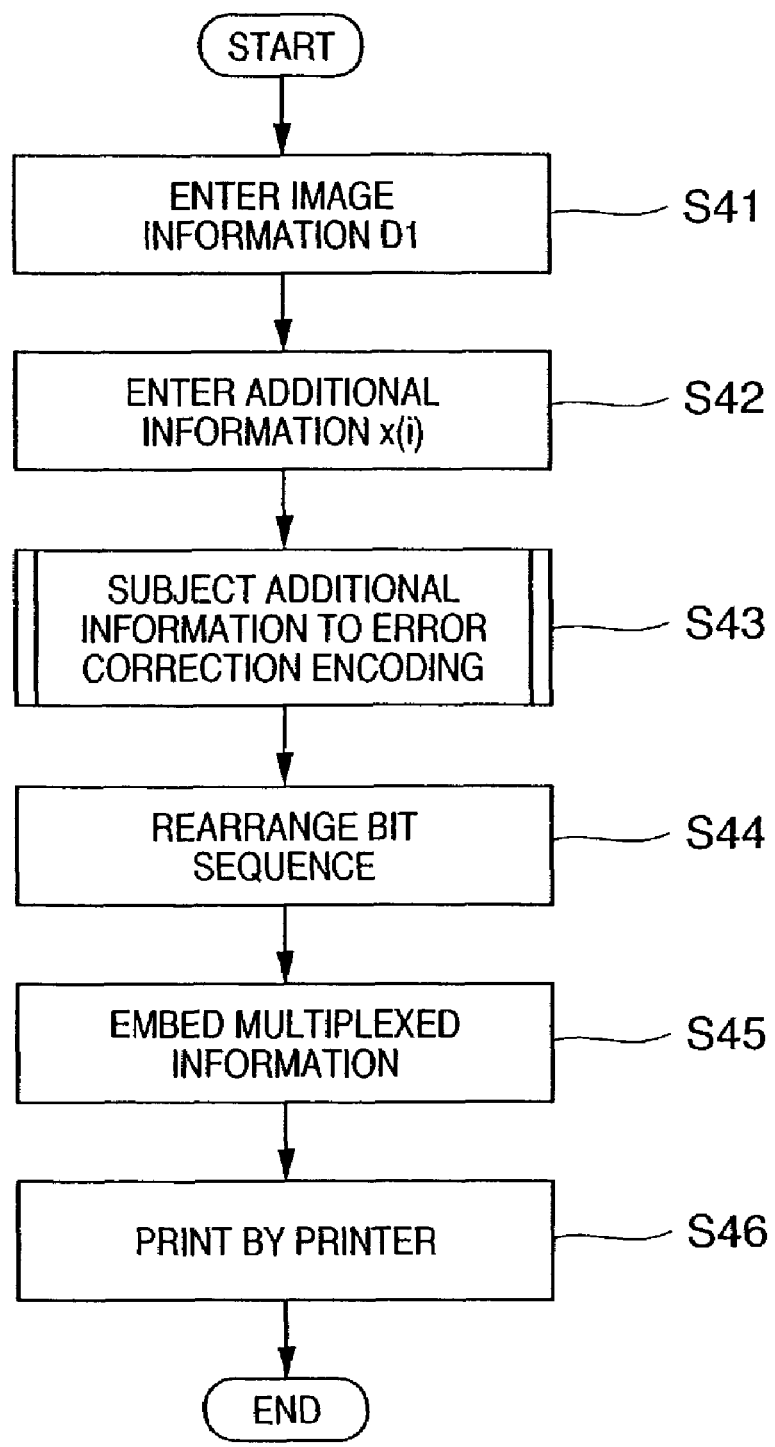
FIG. 4 is a flowchart useful in describing the procedure of operation performed by the image processing apparatus illustrated in FIG. 1.

The procedure of the operation performed by image processing apparatus of this embodiment will now be described in detail. FIG. 4 is a flowchart useful in describing the procedure of operation performed by the image processing apparatus illustrated in FIG. 1.

First, the image information D1 is input from the input terminal 11 (step S41). Next, the additional information x(i) to be multiplexed onto the image information D1 is entered from the input terminal 12 (step S42). The entered additional information x(i) is subjected to error correction encoding by the error correction encoder 13 (step S43). The procedure of the operation performed by the error correction encoder 13 will now be described in detail.

Figure 5:
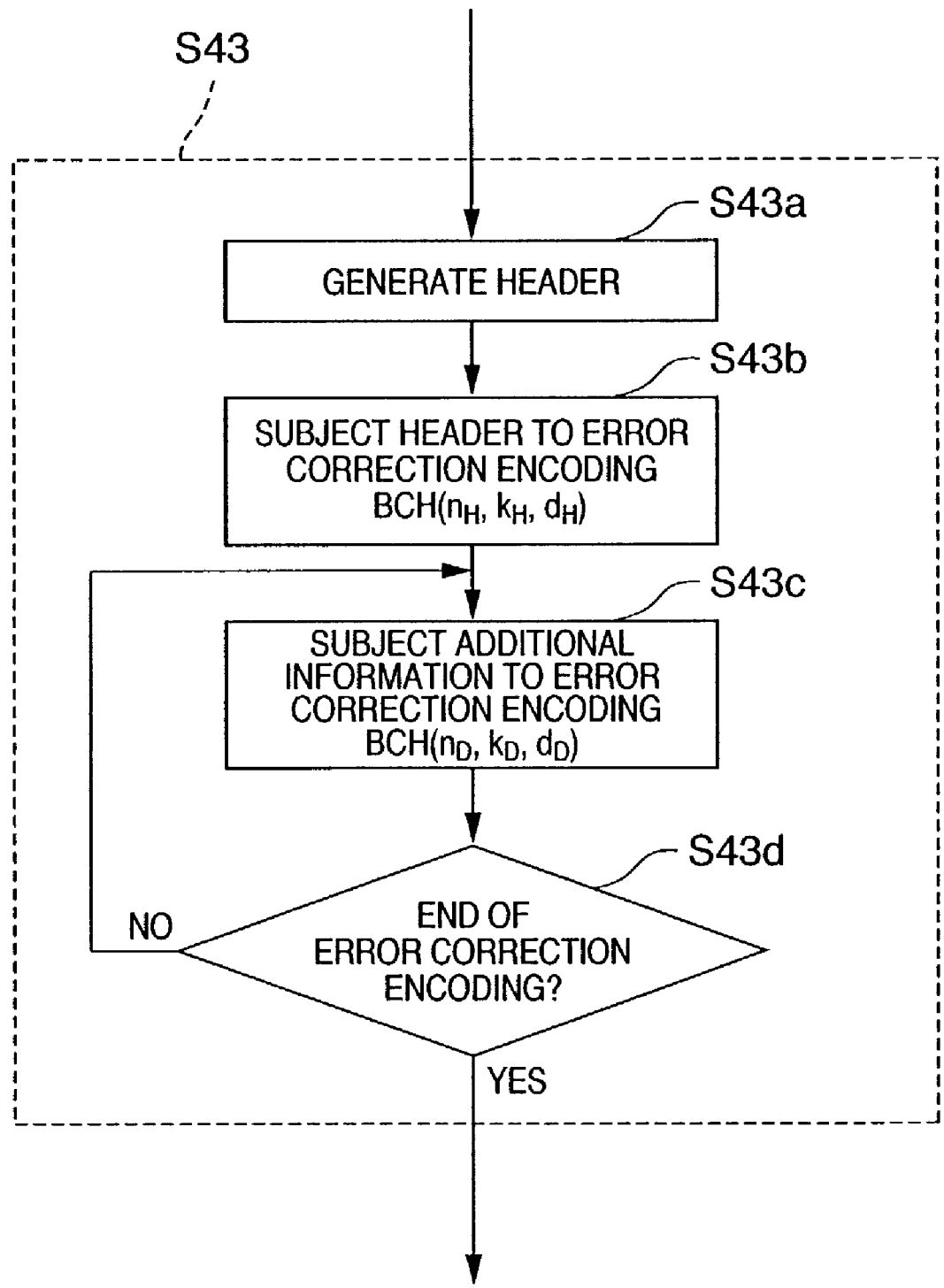
FIG. 5 is a flowchart useful in describing the procedure of operation performed by an error correction encoder.
Figure 6:
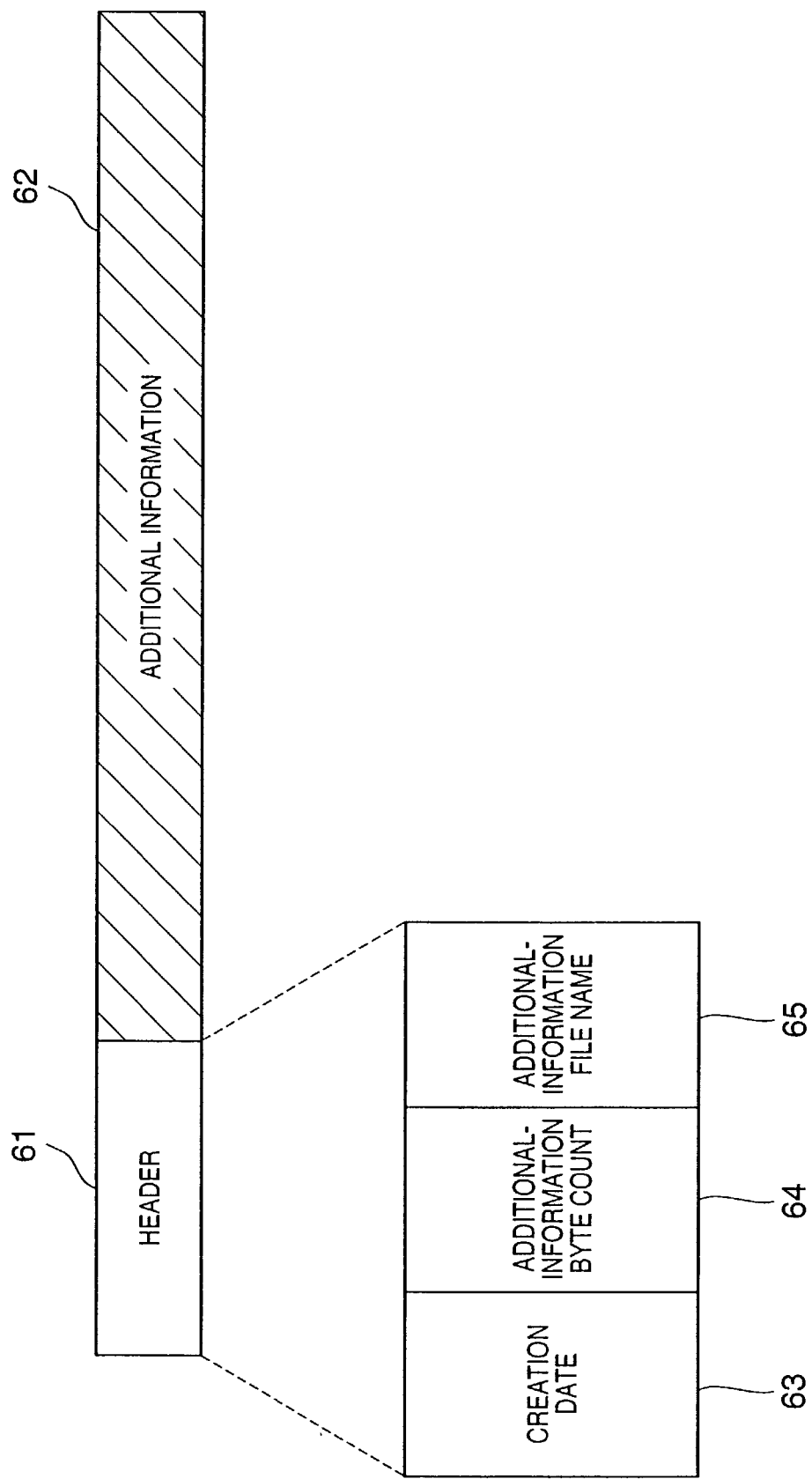
FIG. 6 is a schematic view showing the data format of additional information multiplexed onto an image.

FIG. 5 is a flowchart useful in describing the procedure of the operation performed by the error correction encoder 13. The error correction encoder 13 first generates a header in a data format that contains the additional information x(i) entered from the input terminal 12 (step 43a). FIG. 6 is a schematic view showing the data format of the additional information x(i) multiplexed onto an image. In this embodiment, the data format of the additional information x(i) can be divided broadly into a header 61 and additional information 62. The header 61 contains the following information: creation date 63 on which the multiplexed information y(j) was created, additional-information byte count 64, which indicates the size of the additional information, and additional-information file name 65.

Next, check bits for the purpose of error correction are added onto the additional information x(i) having the data format shown in FIG. 6. First, the header 61 is subjected to BCH error correction encoding using a parameter ($n_H, k_H, d_H$) (step S43b). Furthermore, the additional information 62 is subjected to BCH error correction encoding using a parameter ($n_D, k_D, d_D$) (step S43c). It is then determined whether error correction encoding has ended (step S43d). If the result of the determination is that error correction encoding has ended ("YES" at step S43d), then processing by the error correction encoder 13 is terminated. If the result of the determination is that error correction encoding has not ended ("NO" at step S43d), then control returns to step S43c and error correction encoding is applied to the additional information 62.

The parameter ($n_H, k_H, d_H$) represents an error correction parameter solely for the header 61, and the parameter ($n_D, k_D, d_D$) represents a parameter solely for the additional information 62. Though these two parameters may be exactly the same value, much important information for reconstruction usually is contained in the header 61 and therefore ($n_H, k_H, d_H$) is a parameter having a higher correction capability than ($n_D, k_D, d_D$).

Figure 7:
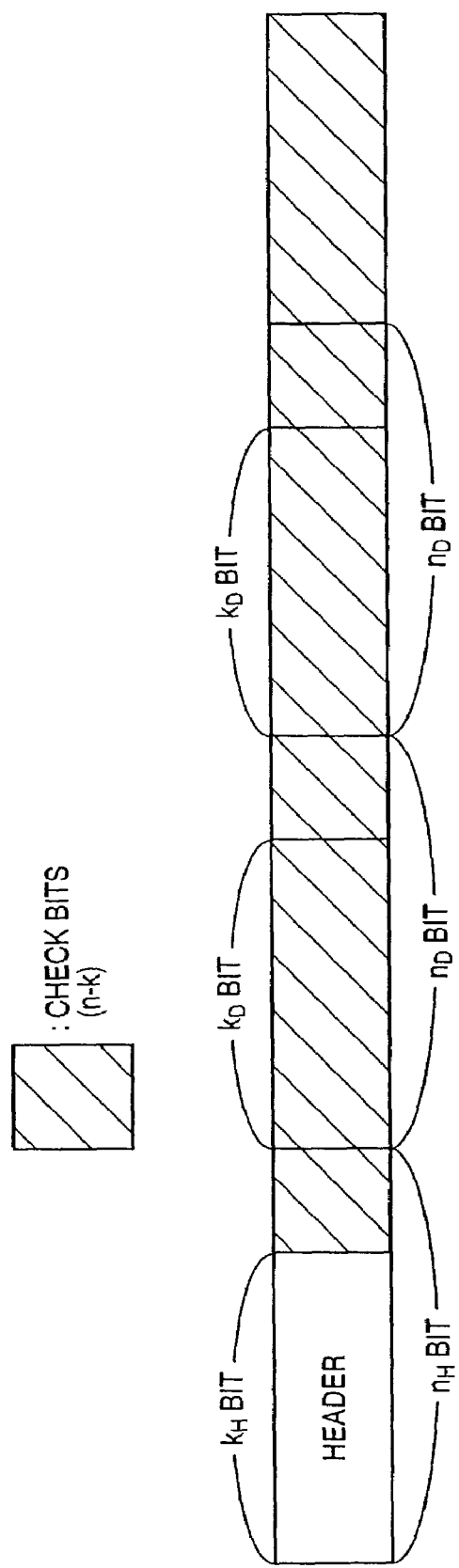
FIG. 7 is a schematic view illustrating the structure of multiplexed information.

With regard to the BCH code used in this embodiment, a bit stream that implements the error correction is divided into segments of $k_D$ bits each, and $n_D-k_D$-number of check bits is added onto each segment. As a result, the multiplexed information y(j) output from the error correction encoder 13 has a structure of the kind shown in FIG. 7. FIG. 7 is a schematic view illustrating the structure of the multiplexed information y(j).

Figure 8:
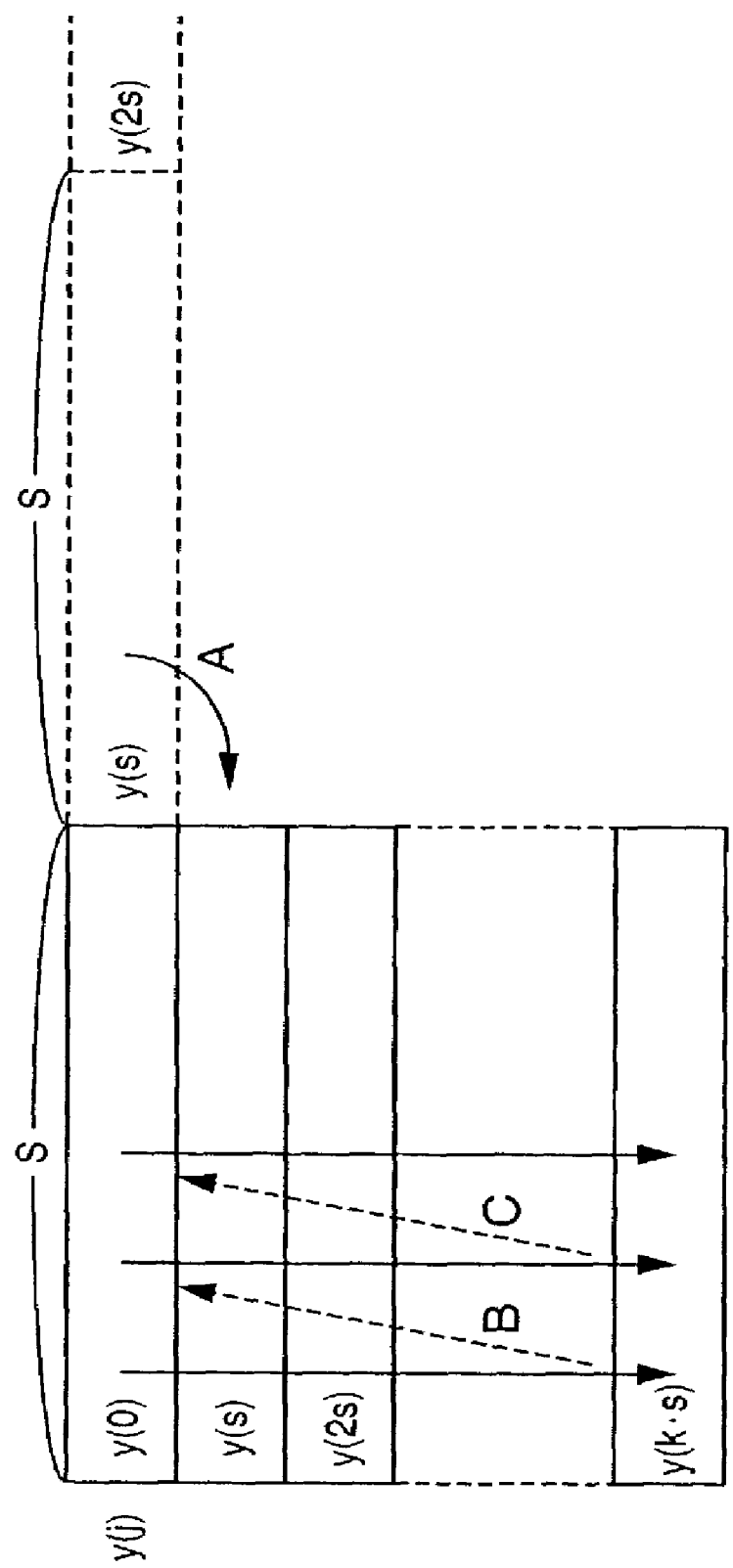
FIG. 8 is a conceptual view useful in describing the specifics of processing for rearranging a bit sequence using a one-dimensional shuffling method executed by a shuffling unit.

The multiplexed information y(j) generated is input to the shuffling unit 14, where the bit sequence is rearranged (step S44). FIG. 8 is a conceptual view useful in describing the specifics of processing for rearranging the bit sequence using a one-dimensional shuffling method executed by the shuffling unit 14. The shuffling unit 14 divides the bit sequence y(j), which is arranged in a single row, into fixed lengths of S bits, thereby creating a plurality of blocks. The shuffling unit 14 then arranges the S-bit blocks vertically, as shown at A in FIG. 8. At this time, information bits y(0), y(S), y(2S) at $0^{th}$, Sth and 2Sth positions become the starting points of respective ones of the blocks, as illustrated in FIG. 8. All blocks of the multiplexed information y(j) are arranged vertically in similar fashion.

Next, the shuffling unit 14 extracts bits from each block in order and rearranges the original bits to thereby create a new bit sequence z(j), as illustrated at B and C in FIG. 8. The new bit sequence z(j) becomes as follows in this case:

$$z = \{y(0), y(S), y(2S), \ldots, y(kS), y(1), y(S+1), y(S+2), \ldots\} \quad (1)$$

Though the parameter S for the purpose of shuffling may be any value, generally it is preferred that $S > n_H$ or $S > n_D$ hold. The reason for this is that in a case where processing for reconstructing additional information is executed, any error that has occurred in mutually adjacent bits will not be included in the same block when error correction decoding is performed.

The new bit sequence z(j) generated by the shuffling unit 14 is input to the additional-information multiplexer 15. The latter embeds the multiplexed information z(j) in the image information D1 to generate image information D2 (step S45). The additional-information multiplexer 15 divides the image information D1 into a plurality of blocks and embeds the information bits of the new bit sequence z(j) in each block of the image information.

More specifically, the multiplexed information z(j), which is additional information in which the bit sequence has been rearranged, is embedded by periodically changing the quantization threshold value of error diffusion block by block. In a case where the additional information has been embedded in the image information D1 by this method, the texture of the image after error diffusion processing merely changes microscopically from block to block. Accordingly, even in a case where a large quantity of additional information has been embedded in an image, it can be so arranged that traces of the additional information in the image information in which the additional information has been embedded will not be noticeable.

The image information D2 thus generated by the additional-information multiplexer 15 is printed by the printer 16 and output on paper as the printed image 17 (step S46).

Figure 9:
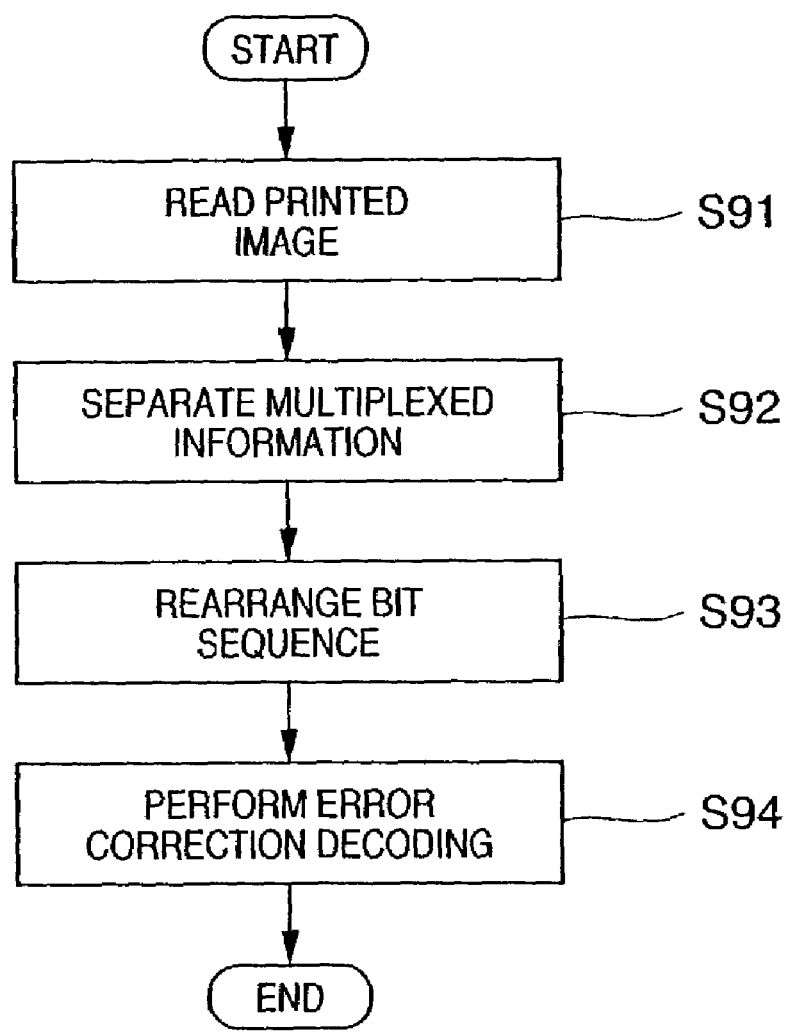
FIG. 9 is a flowchart useful in describing the procedure of the operation performed by the image processing apparatus shown in FIG. 2.

Described next will be the operation of the image processing apparatus, which is shown in FIG. 2, for extracting additional information from a printed image entered by an image scanner. FIG. 9 is a flowchart useful in describing the procedure of the operation performed by the image processing apparatus shown in FIG. 2.

The printed image 17 generated by the image processing apparatus shown in FIG. 1 is input from the image scanner 21 and is converted to image information D3 (step S91). Next, the image information D3 is input to the additional-information demultiplexer 22, where the multiplexed information z'(j) is separated from the image information D3 (step S92). The separated multiplexed information z'(j) is deshuffled and the bit sequence is rearranged by the deshuffling unit 23 (step S93).

The operation of the deshuffling unit 23 is the opposite of that described with reference to FIG. 8. Reading error that has occurred in bursts in specific blocks contained in the bit sequence of the multiplexed information z'(j) can be dispersed over the entirety of the bit sequence by executing this processing. If error is dispersed over the entire bit sequence, there will be a decrease in the maximum value of the number of errors generated in a block of fixed code length in the bit sequence subjected to error correction encoding performed next, and it becomes possible to perform stable correction encoding of encoded error. After processing is thus executed by the deshuffling unit 23, the multiplexed information y'(j) in which the bit sequence has been rearranged is output.

The output multiplexed information y'(j) is subjected to BCH error correction decoding by a well-known method in the error correction decoder 24, which outputs the additional information x(i) (step S94). The additional information x(i) is output from the output terminal 25.

Second Embodiment

In the first embodiment, shuffling of the kind shown in FIG. 8 is applied to the bit sequence y(i) in which the check bits for error-correction purposes have been added onto the additional information x(i). The processing executed in FIG. 8 is defined as one-dimensional shuffling. One-dimensional shuffling is a method suited to a tape medium or the like on which information is recorded in one direction only. However, since processing for multiplexing additional information proposed by the present invention embeds the additional information on a medium such as paper two-dimensionally, there is the possibility that dispersal of the reading error may not be performed sufficiently by the one-dimensional shuffling described above. Accordingly, in this embodiment, a two-dimensional shuffling method is proposed.

Figure 10:
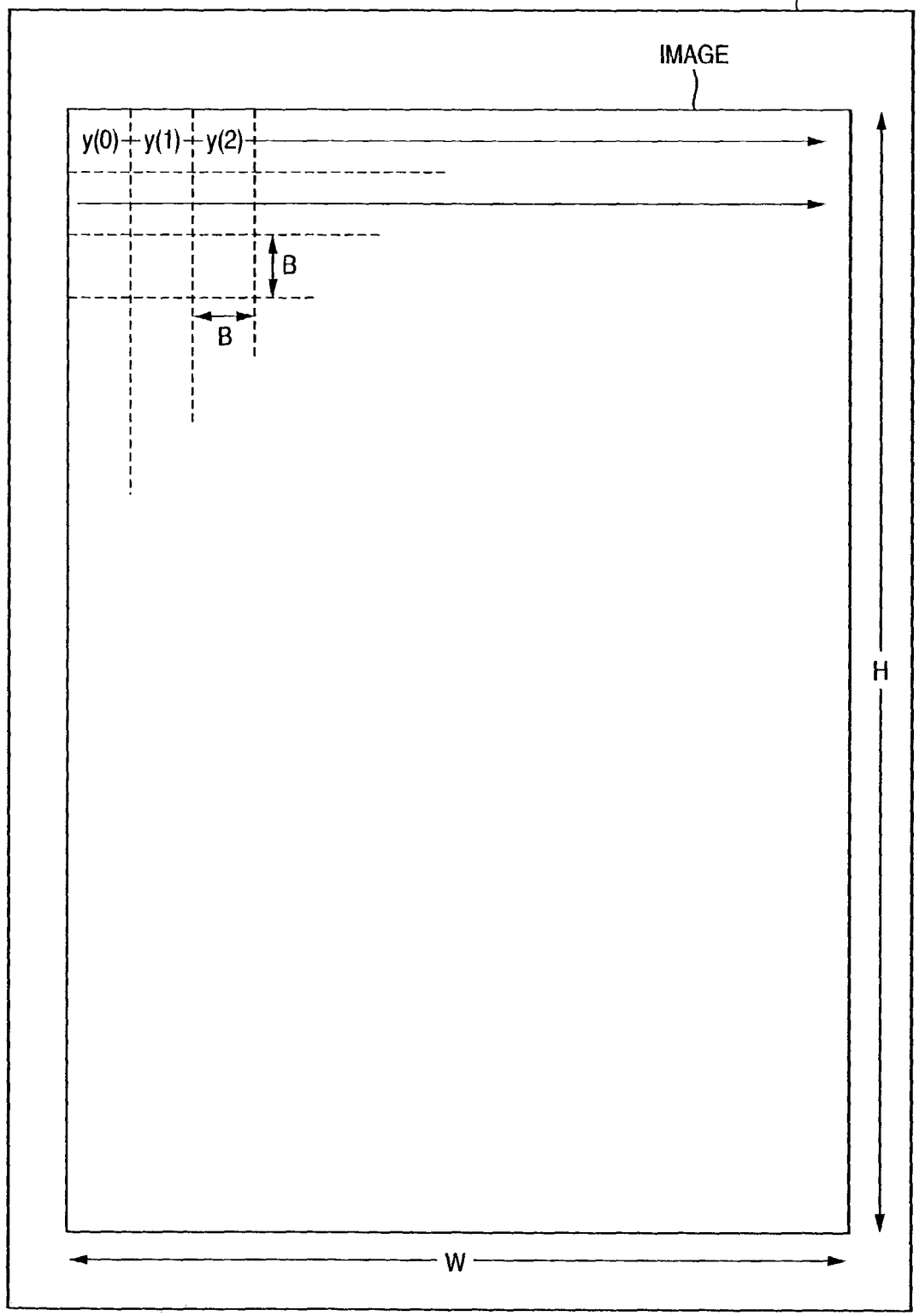
FIG. 10 is a schematic view useful in describing a block in a processing technique for multiplexing additional information disclosed in the specification of Japanese Patent Application Laid-Open No. 2001-148778.

FIG. 10 is a schematic view useful in describing a block in a processing technique for multiplexing additional information disclosed in the specification of Japanese Patent Application Laid-Open No. 2001-148778. In FIG. 10, an image is printed on a recording medium such as paper. In processing for multiplexing additional information disclosed in the specification of Japanese Patent Application Laid-Open No. 2001-148778, the image is divided into blocks of B×B pixels each and information y(j) is recorded one bit at a time block by block, as shown in FIG. 10, in which W and H indicate the size (in pixels) of the image in the horizontal and vertical directions, respectively. Accordingly, the image of FIG. 10 is divided into (W/B)×(H/B)–number of blocks.

Figure 11:
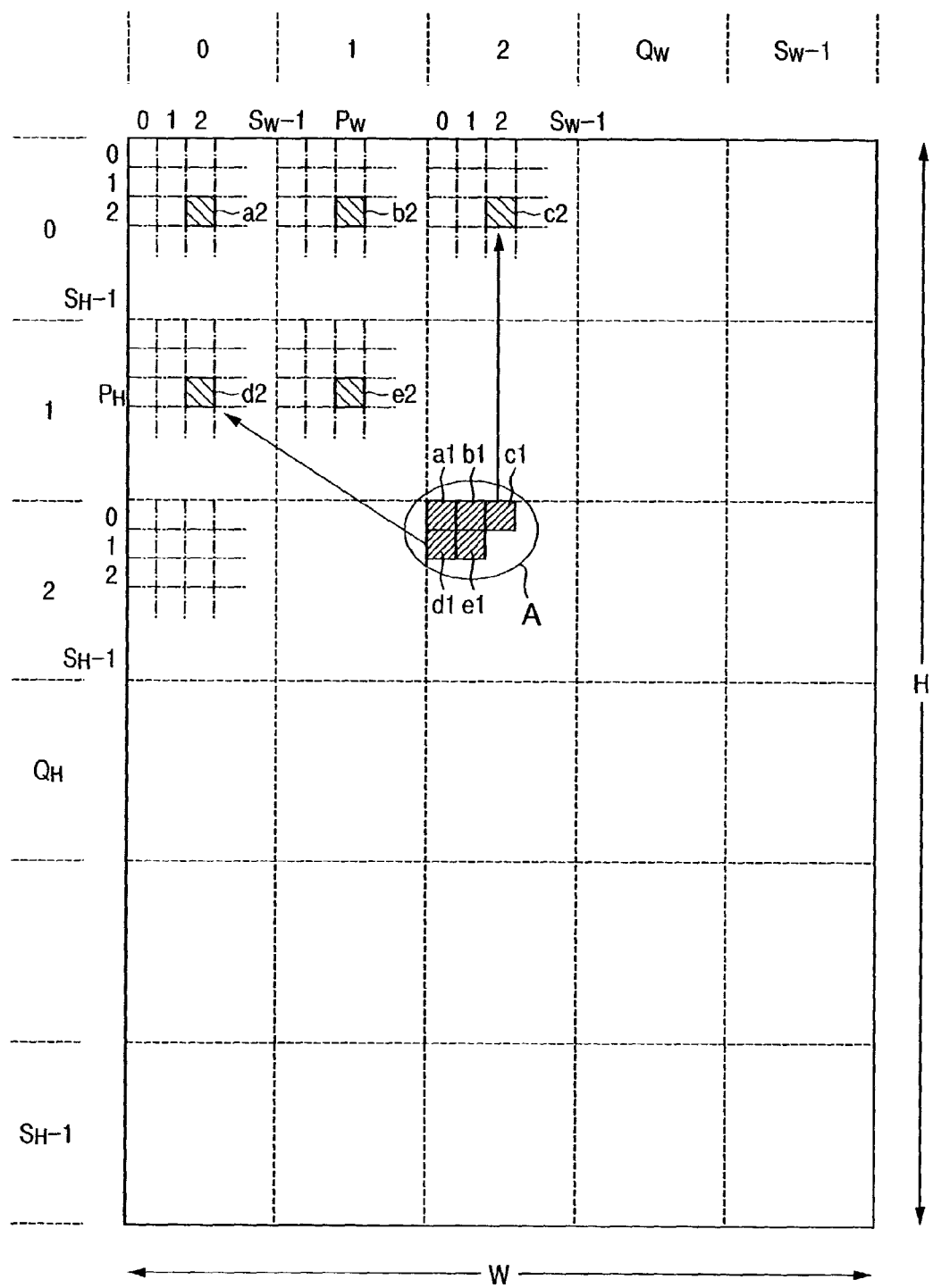
FIG. 11 is a conceptual view useful in describing the specifics of processing executed by the shuffling unit according to this embodiment.
Figure 12:
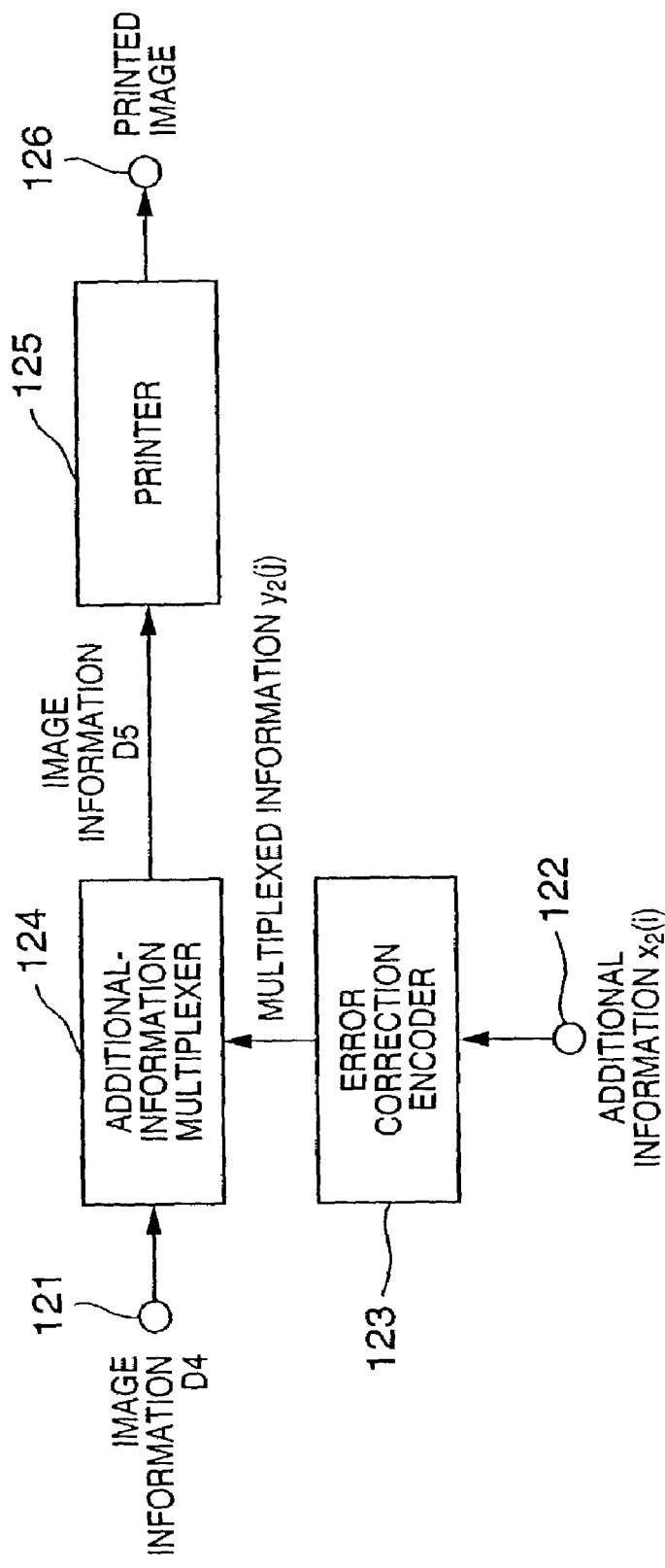
FIG. 12 is a block diagram illustrating the structure of a previously proposed image processing apparatus for embedding additional information in image information and printing the result.
Figure 13:
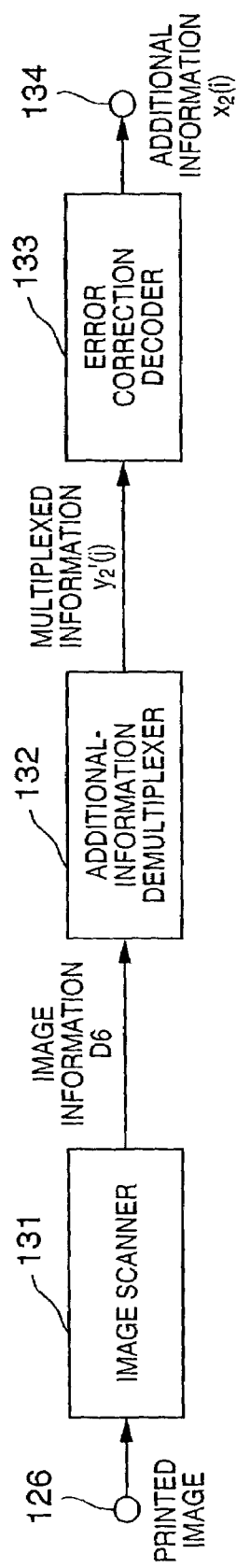
FIG. 13 is a block diagram illustrating the structure of a previously proposed image processing apparatus for reading and extracting additional information from a printed image.

FIG. 11 is a conceptual view useful in describing the specifics of processing executed by the shuffling unit 14 according to this embodiment. In FIG. 11, an area A is one in which error tends to occur when additional information is read. Further, blocks a1 to e1 are blocks in which there is a great possibility that error will be produced when additional information is read. Furthermore, hatched blocks a2 to e2 are the above blocks after their positions have been moved by shuffling according to this embodiment. In FIG. 11, $S_W$ and $S_H$ represent shuffling intervals in the horizontal and vertical directions, respectively, and are calculated as follows:

$$S_W = \sqrt{(W/B)} \quad (2)$$

$$S_H = \sqrt{(H/B)} \quad (3)$$

In this embodiment, entered image information is divided into small areas (referred to as tiles) in units of $S_W$ blocks horizontally and $S_H$ blocks vertically using Equations (2) and (3). In FIG. 11, $Q_W$ and $Q_H$ indicate tile numbers in horizontal and vertical directions, respectively, and $P_W$ and $P_H$ indicate block numbers in horizontal and vertical directions, respectively, in each tile.

By way of example, with the shuffling shown in FIG. 11, bits in block a1 situated at position (0,0) in tile (2,2) are embedded at the position of hatched block a2 at position (2,2) in tile (0,0). Similarly, bits in block c1 situated at position (2,0) in tile (2,2) are embedded at the position of hatched block c2 at position (2,2) in tile (2,0).

The above-described shuffling processing is generalized as follows: Bits of a block situated at position ($P_W$, $P_H$) in tile ($Q_W$, $Q_H$) are embedded at the position of a hatched block at position ($Q_W$, $Q_H$) in tile ($P_W$, $P_H$).

More specifically, the second embodiment of the present invention is characterized in that multiplexed information is composed of bits arrayed two-dimensionally, and in that the shuffling means includes a multiplexed-information dividing unit for dividing multiplexed information into a plurality of blocks of a predetermined size; an image-information dividing unit for dividing image information into a plurality of tiles mapped to the above-mentioned blocks; and a two-dimensional shuffling unit for newly mapping the tiles, which have been mapped to the blocks obtained by division, to prescribed tiles.

Further, the second embodiment is characterized in that the number and placement of the tiles into which the image information has been divided is identical with the number and placement of the blocks into which the tiles have been divided. Furthermore, the second embodiment is characterized in that the two-dimensional shuffling unit interchanges a block at a prescribed position in a prescribed tile and a block at a position that corresponds to the position of the prescribed tile in the image information, this tile being a tile in image information corresponding to the position of the above-mentioned block in the above-mentioned tile.

The foregoing is the description of shuffling according to the second embodiment. Deshuffling in this embodiment makes it possible to reconstruct additional information by executing processing that is exactly the opposite of the shuffling operation described above. Accordingly, if the above-described shuffling is carried out, error that occurs when additional information is read can be dispersed two-dimensionally as compared with one-dimensional shuffling. Hence the embodiment is ideal for application to a multiplexing technique of the kind disclosed in the specification of Japanese Patent Application Laid-Open No. 2001-148778.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium (or storage medium) storing the program codes of the software for implementing the functions of the foregoing embodiments to a system or an apparatus, reading the program codes with a computer (e.g., a CPU or MPU) of the system or apparatus from the recording medium, and then executing the program codes. In this case, the program codes per se read from the recording medium implement the functions of the embodiments and the recording medium storing the program codes constitutes the invention. Furthermore, besides the case where the aforesaid functions according to the embodiments are implemented by executing the program codes read by a computer, it goes without saying that the present invention covers a case where an operating system or the like running on the computer performs a part of or the entire actual processing based upon the designation of program codes and implements the functions of the embodiments by this processing.

It goes without saying that the present invention further covers a case where, after the program codes read from the recording medium are written in a function expansion card inserted into the computer or in a memory provided in a function expansion unit connected to the computer, a CPU or the like contained in the function expansion card or function expansion unit performs a part of or the entire actual processing based upon the designation of program codes and implements the functions of the above embodiments by this processing.

In a case where the present invention is applied to the above-mentioned recording medium, program code corresponding to the flowcharts described earlier would be recorded on the recording medium.

Thus, in accordance with the present invention as described above, reading error that has occurred in bursts when additional information is reconstructed can be dispersed within a bit stream and it is possible to reduce reconstruction error when error correction decoding is performed.

Further, in accordance with the present invention, it is possible to perform shuffling that is ideal for a technique that records information on a two-dimensional recording medium.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:
   error correction encoding means for calculating an error correction code from additional information to be added to image information, and generating multiplexed information in which the error correction code calculated has been added to the additional information;
   shuffling means for rearranging a bit sequence of the generated multiplexed information into a prescribed bit sequence; and
   multiplexing means for embedding the multiplexed information, in which the bit sequence has been rearranged, in the image information,
   wherein the multiplexed information is composed of bits arrayed two-dimensionally, and said shuffling means includes:
   a multiplexed-information dividing unit for dividing multiplexed information into a plurality of blocks of a predetermined size;
   an image-information dividing unit for dividing image information into a plurality of tiles mapped to said blocks; and
   a two-dimensional shuffling unit for newly mapping the tiles, which have been mapped to the blocks obtained by division, to prescribed tiles, and
   wherein the number and placement of the tiles into which the image information has been divided is identical with the number and placement of the blocks into which the tiles have been divided.

2. The apparatus according to claim 1, further comprising printing means for printing the image information in which the multiplexed information has been embedded.

3. The apparatus according to claim 1, wherein said multiplexing means divides the image information into tiles each having a predetermined size and embeds the bits of the bit sequence of the multiplexed information in each of the tiles in order.

4. The apparatus according to claim 1, wherein said shuffling means generates a new bit sequence by rearranging, in order, bits extracted at prescribed intervals from the bit sequence of the multiplexed information.

5. The apparatus according to claim 1, wherein said two-dimensional shuffling unit interchanges a block at a prescribed position in a prescribed tile and a block at a position that corresponds to the position of said prescribed tile in said image information, this tile being a tile in said image information corresponding to the position of said block in said tile.

6. An image processing method comprising:
   a first step of calculating an error correction code from additional information to be added to image information, and generating multiplexed information in which the error correction code calculated has been added to the additional information;
   a second step of rearranging a bit sequence of the generated multiplexed information into a prescribed bit sequence; and
   a third step of embedding the multiplexed information, in which the bit sequence has been rearranged, in the image information,
   wherein the multiplexed information is composed of bits arrayed two-dimensionally, and second step includes:
   a multiplexed-information dividing step of dividing multiplexed information into a plurality of blocks of a predetermined size;
   an image-information dividing step of dividing image information into a plurality of tiles mapped to said blocks; and
   a two-dimensional shuffling step of newly mapping the tiles, which have been mapped to the blocks obtained by division, to prescribed tiles, and
   wherein the number and placement of the tiles into which the image information has been divided is identical with the number and placement of the blocks into which the tiles have been divided.

7. The method according to claim 6, further comprising a fourth step of printing the image information in which the multiplexed information has been embedded.

8. The method according to claim 6, wherein said third step divides the image information into tiles each having a predetermined size and embeds the bits of the bit sequence of the multiplexed information in each of the tiles in order.

9. The method according to claim 6, wherein said second step generates a new bit sequence by rearranging, in order, bits extracted at prescribed intervals from the bit sequence of the multiplexed information.

10. The method according to claim 6, wherein said two-dimensional shuffling step interchanges a block at a prescribed position in a prescribed tile and a block at a position that corresponds to the position of said prescribed tile in said image information, this tile being a tile in said image information corresponding to the position of said block in said tile.

11. A computer program, embodied in a computer-readable medium, for controlling an image processing apparatus that prints image information, comprising:
   program code of a first step of calculating an error correction code from additional information to be added to image information, and generating multiplexed information in which the error correction code calculated has been added to the additional information;
   program code of a second step of rearranging a bit sequence of the generated multiplexed information into a prescribed bit sequence; and
   program code of a third step of embedding the multiplexed information, in which the bit sequence has been rearranged, in the image information,
   wherein the multiplexed information is composed of bits arrayed two-dimensionally and said second step includes:
   a multiplexed-information dividing step of dividing multiplexed information into a plurality of blocks of a predetermined size;
   an image-information dividing step of dividing image information into a plurality of tiles mapped to said blocks; and a two-dimensional shuffling step of newly mapping the tiles, which have been mapped to the blocks obtained by division, to prescribed tiles, and wherein the number and placement of the tiles into which the image information has been divided is identical with the number and placement of the blocks into which the tiles have been divided.

* * * * *

UNITED STATES PATENT AND TRADEMARK OFFICE
CERTIFICATE OF CORRECTION

PATENT NO. : 7,079,267 B2 Page 1 of 1
APPLICATION NO. : 10/244016
DATED : July 18, 2006
INVENTOR(S) : Kiyoshi Umeda et al.

It is certified that error appears in the above-identified patent and that said Letters Patent is hereby corrected as shown below:

COLUMN 2:
Line 31, "convolution al" should read --convolutional--.
Line 64, "$y_2'(j)$ ." should read --$y_2'(j)$.--

COLUMN 9:
Line 34, "al" should read --a1--.

Signed and Sealed this

First Day of May, 2007

JON W. DUDAS
*Director of the United States Patent and Trademark Office*